(12) United States Patent
Mayoraz et al.

(10) Patent No.: US 7,057,607 B2
(45) Date of Patent: Jun. 6, 2006

(54) APPLICATION-INDEPENDENT TEXT ENTRY FOR TOUCH-SENSITIVE DISPLAY

(75) Inventors: Eddy Mayoraz, Palo Alto, CA (US); Jin Guo, Sunnyvale, CA (US); Charles Yimin Wu, Palo Alto, CA (US)

(73) Assignee: Motorola, Inc., Schaumburg, IL (US)

( * ) Notice: Subject to any disclaimer, the term of this patent is extended or adjusted under 35 U.S.C. 154(b) by 356 days.

(21) Appl. No.: 10/609,998

(22) Filed: Jun. 30, 2003

(65) Prior Publication Data

US 2004/0263487 A1 Dec. 30, 2004

(51) Int. Cl.
*G09G 5/00* (2006.01)

(52) U.S. Cl. .................. 345/173; 345/174; 345/177; 382/116; 382/117; 382/118; 382/181; 178/18.01; 178/18.03

(58) Field of Classification Search ............... 345/173, 345/174, 177; 382/116–118, 181; 178/18.01, 178/18.03
See application file for complete search history.

(56) References Cited

U.S. PATENT DOCUMENTS

| | | | | |
|---|---|---|---|---|
| 5,434,929 A | * | 7/1995 | Beernink et al. | ........... 382/187 |
| 5,521,986 A | * | 5/1996 | Curtin et al. | ............... 382/187 |
| 5,952,942 A | | 9/1999 | Balakrishnan et al. | |
| 6,009,444 A | | 12/1999 | Chen | |
| 6,104,317 A | | 8/2000 | Panagrossi | |
| 6,286,064 B1 | | 9/2001 | King et al. | |
| 6,378,234 B1 | | 4/2002 | Luo | |
| 6,844,885 B1 | * | 1/2005 | Anderson et al. | ........... 345/650 |
| 2002/0049795 A1 | | 4/2002 | Freeman | |
| 2002/0136371 A1 | | 9/2002 | Bozorgui-Nesbat | |

OTHER PUBLICATIONS

Goldberg, David, and Cate Richardson. "Touch-Typing With a Stylus," Interchi '93 Conference Proceedings: Conference on Human Factors in Computing Systems, Apr. 24-29, 1993, pp. 80-87, ACM.

Gopher, Daniel, and David Raij. "Typing With a Two-Hand Chord Keyboard: Will the Qwerty Become Obsolete?," IEEE Transactions on Systems, Man, and Cybernetics, Jul./Aug. 1988, pp. 601-609, vol. 18, No. 4.

Kurtenbach, Gordon, and William Buxton. "The Limits of Expert Performance Using Hierarchic Marking Menus," Interchi '93 Conference Proceedings: Conference on Human Factors in Computing Systems, Apr. 24-29, 1993, pp. 482-487, ACM.

(Continued)

*Primary Examiner*—Bipin Shalwala
*Assistant Examiner*—Leonid Shapiro

(57) ABSTRACT

A user interface method and apparatus for an electronic device operates by detecting (108) a stroke of a touch sensitive display (170) forming a part of the electronic device. The stroke is categorized (116) as one of a swish type stroke and a non-swish type stroke. If the stroke is a non-swish stroke, it is translated (132) into an application function. If the stroke is a swish stroke, it is converted (128) to a character input function. The touch sensitive display (170) has a grid (50) containing cells (51, 53, etc.), with each cell containing a plurality of characters, and the grid can overlay application interface to thereby occupying a common area, up to and including the entire area, of the touch sensitive display (170).

14 Claims, 5 Drawing Sheets

OTHER PUBLICATIONS

Mackenzie, I. Scott, and Shawn X. Zhang. "The Design and Evaluation of a High-Performance Soft Keyboard," Proceedings of Chi'99: ACM Conference on Human Factors in Computing Systems, May 15-20, 1999, pp. 25-31.

Mankoff, Jennifer, and Gregory D. Abowd. "Cirrin: A Word-level Unistroke Keyboard for Pen Input," Proceedings of the 11th Annual ACM Symposium on User Interface Software and Technology, 1998, pp. 213-214.

Masui, Toshiyuki. "POBox: An Efficient Text Input Method for Handheld and Ubiquitous Computers," Lecture Notes in Computer Science (1707), Handheld and Ubiquitous Computing, 1999, pp. 289-300, Springer-Verlag.

Perlin, Ken. "Quikwriting: Continuous Stylus-based Text Entry," Proceedings of the 11th Annual ACM Symposium on User Interface Software and Technology, 1998, pp. 215-216.

Samson, Ilan, "Hand-pick," private communication, Dec. 2001.

Ward, David J., Alan F. Blackwell, and David J. C. Mackay. "Dasher—a Data Entry Interface Using Continuous Gestures and Language Models," Proceedings of the 13th Annual ACM Symposium on User Interface Software and Technology, 2000, pp. 129-137.

* cited by examiner

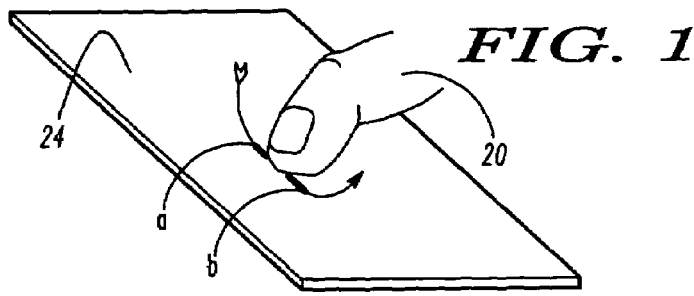

APPLICATION-INDEPENDENT TEXT ENTRY FOR TOUCH-SENSITIVE DISPLAY

FIELD OF THE INVENTION

This invention relates generally to the field of human interfaces for electronic devices. More particularly, certain embodiments consistent with this invention relate to an application-independent text entry system and method for a touch sensitive medium such as a touch sensitive display.

BACKGROUND OF THE INVENTION

A desktop computing device usually offers two basic input devices: the keyboard and the mouse. Text input is provided through the keyboard, while pointing (moving pointer, selecting) as well as most window management actions (resizing, scrolling, menu selection, etc.) are executed with the mouse. There is also some redundancy, since the keyboard can also control navigation (arrow keys) and some window manager actions (with shortcut keys).

On a handheld device a touch sensitive area on the display is commonly used as the only or primary input interface. The total display area on such a device may be shared for display, text entry and application icons. The size of such a display limits the user's ability to easily enter data and limits the ability to have an easily usable dedicated area for text input. On such devices that use a dedicated input area, it's size may be too small to be accurately accessed by finger. In such cases, a stylus is used to enter text.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 1 is an illustration of a swish movement consistent with certain embodiments of the present invention;

FIG. 2 is a table illustrating the characteristics of strokes on a touch sensitive display with a swish stroke contrasted with other types of strokes;

FIG. 3 illustrates an exemplary text entry grid layout consistent with certain embodiments of the present invention;

FIG. 4 illustrates several swish strokes consistent with certain embodiments of the present invention;

DETAILED DESCRIPTION OF THE INVENTION

Figure 5:
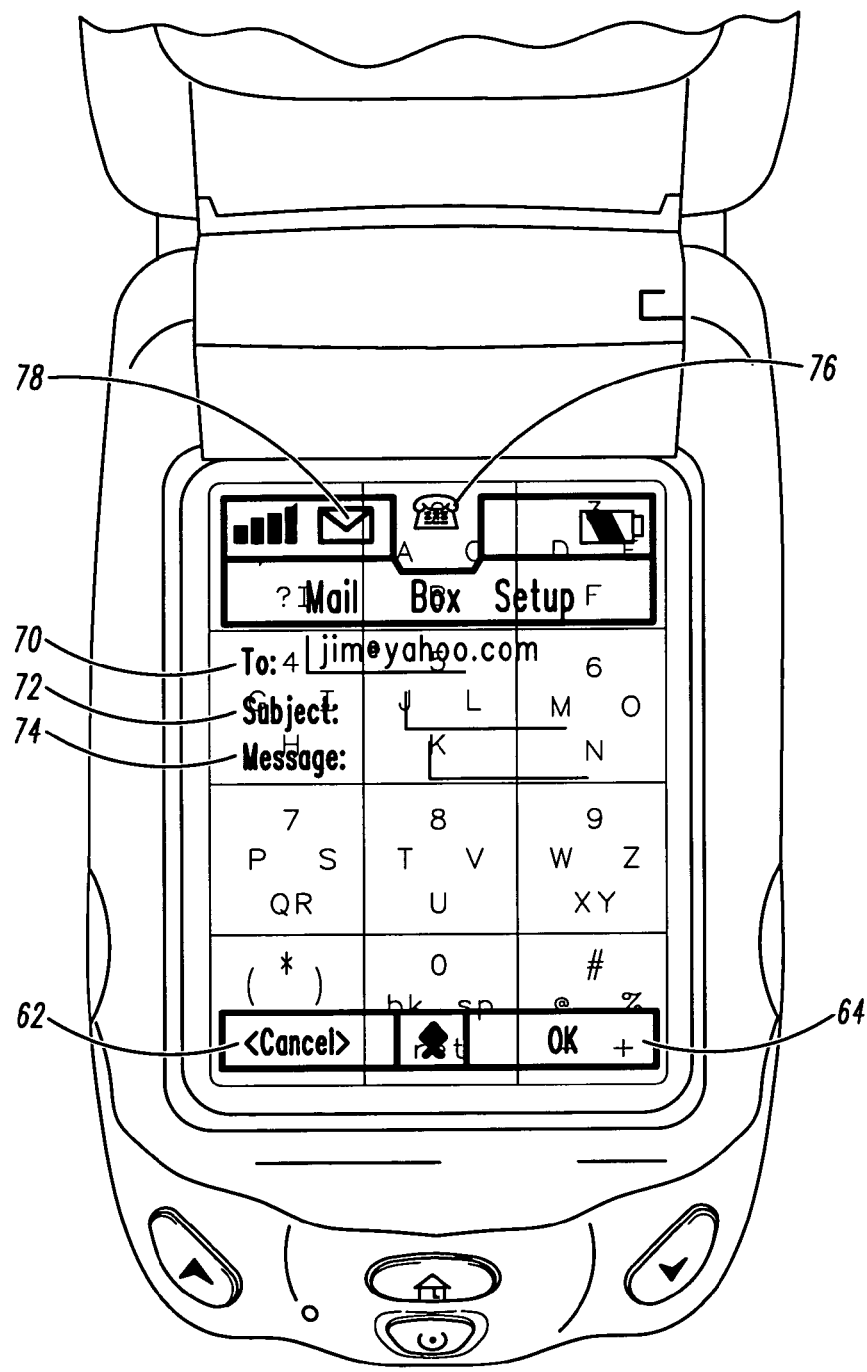
FIG. 5 is an exemplary hand-held device such as a wireless telephone or PDA using a touch sensitive display consistent with certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding elements in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/ dynamic load library and/or other sequence of instructions designed for execution on a computer system.

The terms "text", "symbol" and "character" as used herein is intended to include characters and common punctuation characters along with any other characters that might be desirably entered via a single stroke of a keyboard (e.g., +, /, \, |, #, @, ~, backspace, etc.). Additionally, these terms are to be considered both singular and plural, in that a reference to entering a character can include making a single entry that contains multiple characters (e.g., commonly used combinations of characters such as "QU" or "SH" may be handled in some data entry scenarios the same as if the combinations were a single character). Moreover, the terms "text", "symbol" or "character" may take on equivalent meanings for character sets other than those commonly used in connection with the English language.

The term "grid" as used herein can mean a conventional linear X-Y grid that divides an area into multiple rectangular cells. However, the term can also mean circular grids, spiral grids, irregular shaped grids, or other shapes than simple X-Y grid systems, with subdivisions of such grid systems also being referred to as "cells", "zones" or "regions". The term "grid" also encompasses the characters and/or commands associated with the grid. Depending on the context, the terms "zone" and "region" can also be used within a less restrictive dictionary meaning to identify a particular general area of a touch sensitive medium.

The text input user interface for small hand-held devices has always been a data entry bottleneck, and the problem worsens as such devices get smaller and increasingly powerful. A broad range of solutions have been proposed to tackle this issue, from foldable keyboards, to voice recognition. Certain embodiments consistent with the present invention, relate to methods and apparatus for permitting the data entry area of a touch sensitive medium such as a touch sensitive display (or touchscreen) to be shared with an application's display functions (e.g., prompts, icons, data entry box, windows, menus, and other visual objects, etc.) without conflict. If the text input area is shared with areas that display the application, conflicts may occur wherein the device of interest may receive input that could be interpreted either as text entry or application commands. Certain embodiments consistent with the present invention seek to resolve such conflicts by segregating classes of data entry motions that correspond to text entry from those which might represent selection of icons, menu items or other application functions.

A text input method consistent with certain embodiments of the present invention is provided herein that is especially useful for a small handheld device with a touch sensitive display. Such embodiments can be simple, fast, accurate, and can avoid conflict with application functions. Certain embodiments consistent with the present invention utilize a text entry motion referred to as a swish, which is illustrated in FIG. 1. A finger 20 touches the touch sensitive display surface 24 at point a, then slides approximately linearly to point b where it is released. A swish is, thus, a touch-move-release sequence of the touching device, that A) has a non-negligible diameter; B) is location dependent; C) has a negligible delay between the touch and the beginning of the move; and that ideally has the following characteristics: D) fast (short time lag between touch and release—e.g., approximately on the order of 100 ms); E) small (small diameter); and F) simple (single direction).

While one of the conditions D, E, or F could be relaxed as will be discussed below, the first three conditions provide the definition of a basic swish as used herein. In alternative embodiments, other general requirements for defining a swish or an analogous or functionally equivalent motion could be defined, without departing from certain embodiments consistent with the present invention. A sequence that fulfills B and C but violates A is considered a tap. A sequence that is location independent is considered a gesture. A sequence violating C but satisfying A and B is either a selection (like when a word is selected in a text processor) or a select and drag sequence (moving an object from one place to another). A long swish may either retian the time $t_b-t_a$ constraint or relax it according to the actual distance traversed by the stroke. FIG. 2 can be used to clarify this definition by illustrating different strokes that are or are not swishes, as well as variations in acceptable swish type strokes when certain conditions are relaxed. In FIG. 2, a stroke is presented as it would appear on the touch sensitive display, along with a graph of curvilinear length versus time, in order to illustrate the time component.

With reference to FIG. 2, the time $t_b-t_a$ for a swish will vary from user to user and will vary with the size and layout of the input touch sensitive medium. In experiments conducted with a palmtop computer size device, the average time $t_b-t_a$ for a swish was approximately 100 ms with times varying in a bell shaped curve ranging from about 30 ms to about 170 ms, with a few times being as long as 500 ms. An appropriate range of times that can define an appropriate time range or threshold to define a swish can be determined experimentally for a given touch sensitive medium's layout and size. The average distance used to produce a swish key stroke in the above experiments was approximately 0.75 times the height or width of a square key, and ranged from approximately 0.1 to approximately 2 times the height or width of a square key. These experimental characteristics can be used as a starting point for establishing threshold boundaries that can be used to make a decision as to whether or not a swish type stroke has been executed, but further refinement is possible for any given touch sensitive medium and key layout. Thus, these time and distance parameters should be considered a guideline for the start of experiments and should not be considered limiting.

In accordance with certain embodiments consistent with the present invention, a text or character input method can be devised which is based only on swishes (as opposed to other techniques which rely on more complex strokes and/or a combination of swishes with taps and/or other complex strokes. In order to use swishes for text entry, a design process can follow the following basic procedure. First, define a type of stroke, (e.g., the swish stroke), that is simple but specific enough to be distinguishable from any other strokes produced by a touching device during any possible actions that are not related to text input. Second, map every symbol or character to be entered (i.e. the keyboard) to this type of stroke (swish). In this way, the set of actions for entering text is disjoint from all other actions involving the touching device. This allows the text entry area to occupy as much of the display's real estate for the text input method as desired, up to and including the entire display. Additionally, in certain embodiments, it may be unnecessary to use a special stroke to switch between an application mode and a character entry mode.

Figures 3, 4:
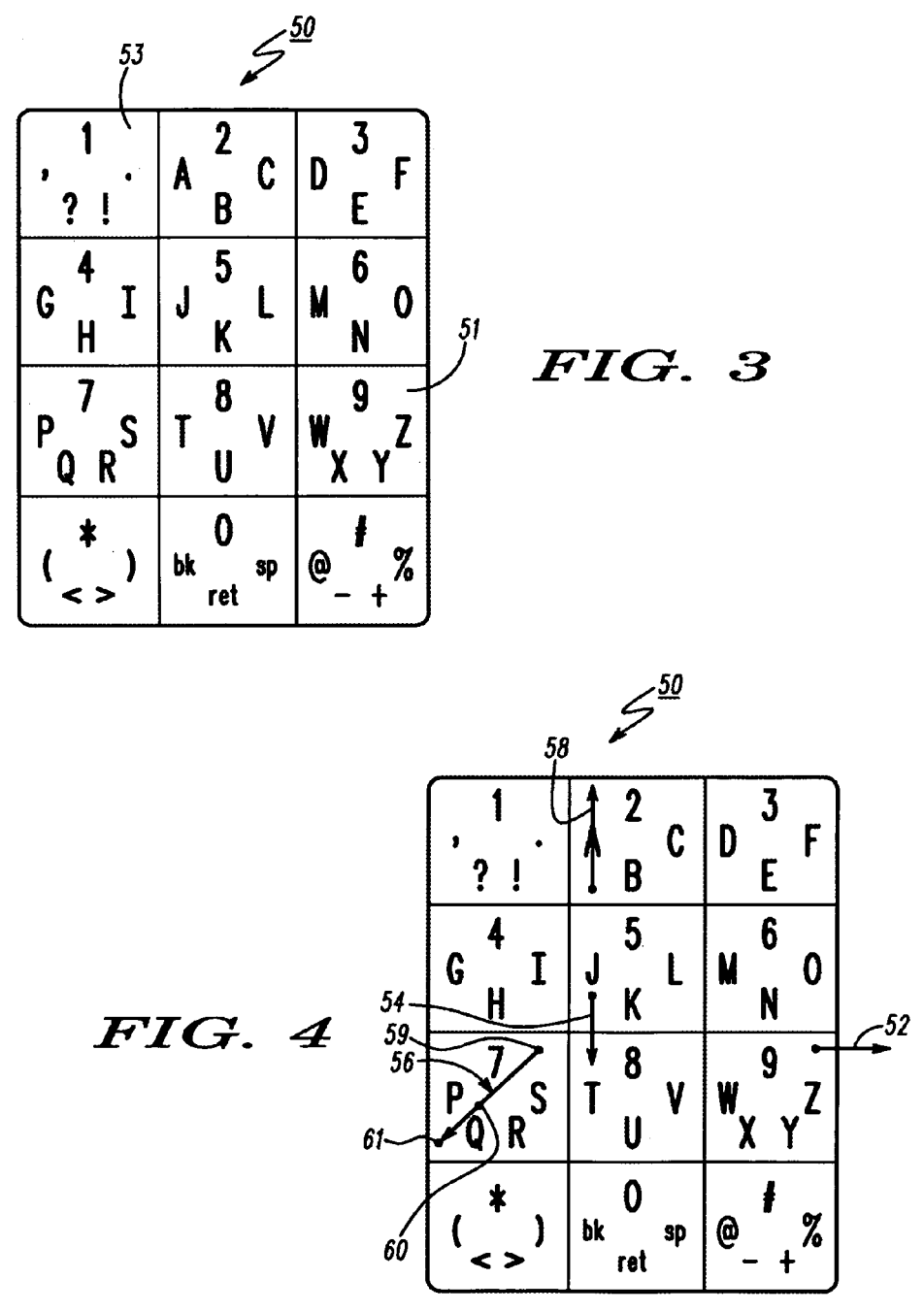

One exemplary mapping from swishes to symbols is represented by an X-Y grid 50 as exemplified in FIG. 3. In this layout 4–5 characters are represented by each cell (e.g., cells 51 and 53) in the grid. In this example layout, no attempt has been made to optimize the placement of the characters, but such optimization and rearrangement of the location and content of the characters in the grid is contemplated in certain embodiments of the present invention. Thus, many other layouts can be used without departing from the present invention.

In this layout, the character position in the grid represents a direction of movement used to enter a particular character. Thus, the character "3" corresponds to an upward movement of the swish, while the character "G" represents a right to left swish. A swish used to select a particular character starts in the cell containing the character (anywhere in the cell) and a swish stroke is carried out in the direction dictated by the character placement. Thus, a unique point (e.g. the touching point, or some average point along the stroke) as well as a direction is associated with each stroke. The cell of the grid containing the point associated with a stroke together with the direction uniquely determines the symbol entered.

Using the same grid as illustrated in FIG. 3, FIG. 4 depicts several exemplary swish strokes that can be used to generate a character input. The arrows start at the touching point corresponding to point "a" in FIG. 1 and FIG. 2, the arrow head indicates the releasing point corresponding to point "b" in FIG. 1 and FIG. 2. Thus, in this illustrative example, stroke 52 is used to input the character "Z", stroke 54 is used to input the character "J"; stroke 56 is used to input the character "Q"; and stroke 58 is used to input the character "A". In this exemplary embodiment, each of the characters represented in the grid can be similarly input into a device using only swish strokes.

Considering stroke 56 by way of example and not limitation, this stroke can be characterized by capturing the x-y location of the initial touch point 59 and a time associated therewith, the x-y location of an intermediate touch point 60 along the path of the stroke and a time associated therewith, and the x-y location of a release point 61 and a time associated therewith. These points and times can be used in the manner described later to characterize whether or not the stroke can be classified as a swish stroke or not, and further to determine a mapping to a character represented by the swish stroke.

In order to distinguish between the entry of text characters as illustrated above, and other commands for any given command, taps (or taps in combination with other strokes, or other strokes) can be used for commands. A grid such as that illustrated in FIG. 3 can be displayed as an overlay (or underlay, or in different colors, different intensity—fixed or variable, etc.) to a display together with windows or other application objects on the touch sensitive area. The data input area can then be extended up to and including the entire size of the display if desired without conflict or confusion with application commands involving selection of display objects. Such a display is depicted in FIG. 5 in an environment such as a wireless telephone device, messaging or paging device, or PDA.

In this illustrative example, the text entry area represented by the grid co-occupies substantially all of the display's active area with an application's user interface. In certain embodiments, the grid is always on simultaneously with the application's user interface. (In other embodiments, the grid can be reduced in prominence or turned off selectively by the user.) By making the text entry area the maximum size (for small, hand-held devices) no special stylus is required to enter text. Instead, a human finger can provide strokes that form the input. In this example, an email application is illustrated, but any suitable application can operate in the same manner. In this example, when a tap occurs in at a menu selection "button" such as the "Cancel" or "OK" buttons 62 and 64 respectively, the device interprets a tap (a convenient and common example of a non-swish stroke, but should not be considered limiting) to mean that such soft coded buttons are being actuated. Similarly, a user can tap the "To:" line 70, the "Subject:" line 72 or the "Message" line 74 to initiate an entry into one of their associated text entry boxes.

Icons such as the telephone icon 76 or envelope icon 78 can similarly be activated by a tap of the display in the location of such icons, or by another suitable non-swish type stroke. If, for example, the "Message:" line 74 is selected, the text entry box associated therewith is opened and the user can proceed by use of swish strokes (or equivalent stroke defined to provide an unique character entry stroke type) to enter the message of an email, in this example. Since the type of stroke used is inherently different for swishes and taps, the device can readily determine that an application selection is being made versus a character entry. Thus, the set of text input commands is disjoint from any other command of all possible application commands, so that the text input task can be always be active without ever interfering with or creating ambiguous input for other applications (including the operating system). This also permits the text entry screen to simultaneously occupy a larger amount of the display's real estate, up to and including the entire display.

Once a user becomes proficient at text entry, the user may be able to enter text without need for a character overlay. Or, the overlay may be simplified (e.g., by use of only lines dividing the screen into cells, or by using a more faint overlay that is less intrusive to the display of application display information). In certain embodiments, the overlay can be selectable to be a solid grid with characters that appear rather boldly on the display overlaying the application interface (e.g., email, contact list, calendar, text processing, graphics, mapping, games, spreadsheet, dictionary, encyclopedia, reference material, puzzles, etc.). In this mode, the grid and associated characters (collectively the "grid") is always prominently displayed overlaying the application interface. Once the user becomes comfortable with the location of the characters within the grid, the characters can fade in brightness or contrast or change in color to become less prominently displayed on the screen and can ultimately be turned off to eliminate the characters. Similarly, the grid lines themselves can be reduced in intensity of brightness, contrast, color etc. to become less prominent. Additionally, the grid can change from solid lines to broken or dashed lines, may be reduced in prominence to + markings at the intersections and/or single dashes at the periphery of the display or use other techniques to make them less prominent if desired for the more experienced user. Thus, the grid and associated characters or commands (collectively "the grid") can be displayed in multiple modes wherein the prominence of the grid is varied in the different modes to accommodate the user's preference and to facilitate both inexperienced and experienced users. Other variations will occur to those skilled in the art upon consideration of the present teaching.

Thus, the grid can form a part of the user interface, wherein a feature of the grid, such as the characters or the grid lines for example, is displayed prominently in a first display mode and less prominently in a second display mode. The grid feature is displayed in the second display mode in a different manner than in the first display mode by use of a different color, a lesser intensity, a lower contrast, dashed lines, broken lines, etc.

Figure 6:
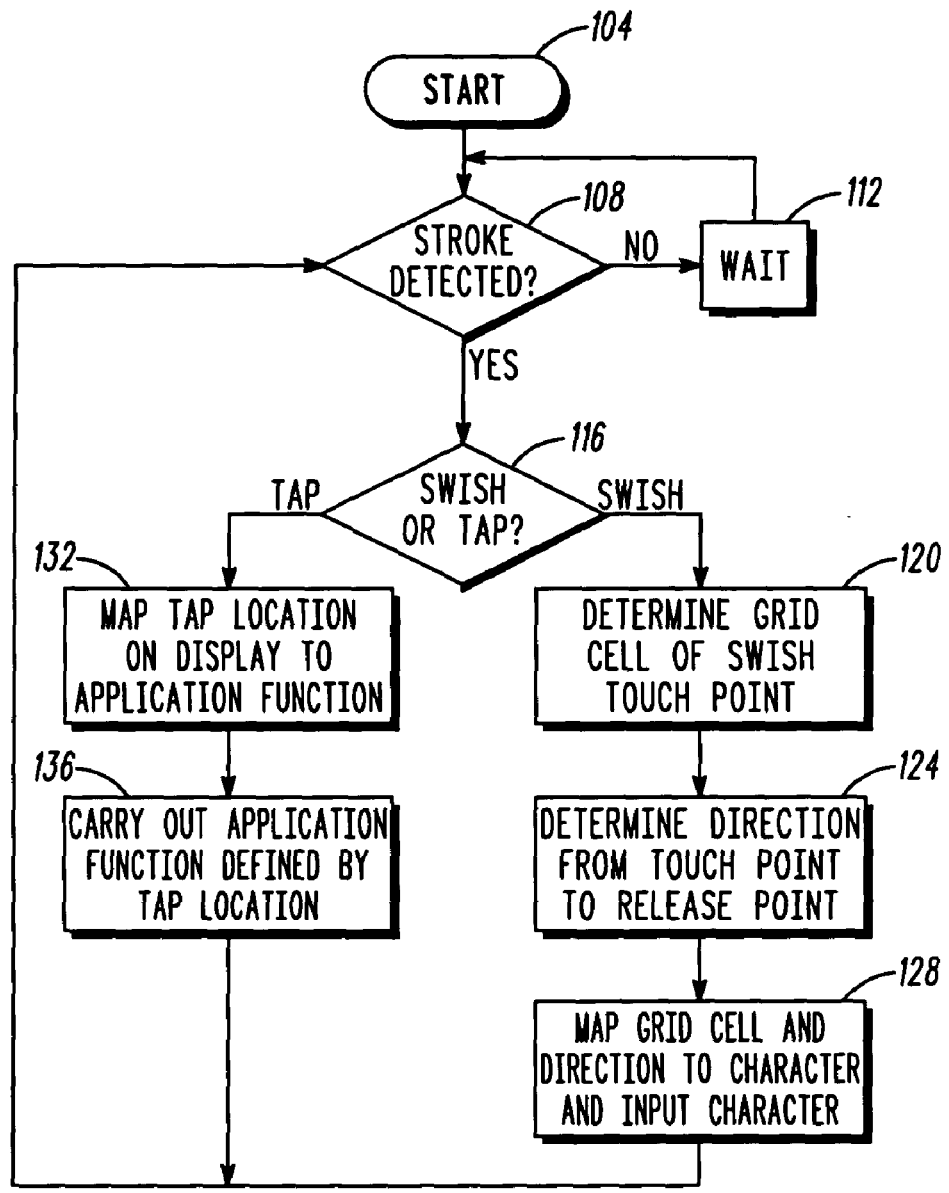
FIG. 6 is a flow chart depicting operation of an electronic device such as a hand-held PDA, messaging or paging device, or wireless telephone in a manner consistent with certain embodiments of the present invention.

FIG. 6 depicts one simple process 100 that such a hand-held device such as a telephone, messaging or paging device, PDA, etc., can use to operate using the above described swish-based text entry system. In this process, the only possible inputs are swish strokes and taps, and the system uses swishes exclusively for text entry and, by way of example, uses tap strokes (or other non-swish strokes) for application specific selections. In other embodiments, other unique stroke classifications could be equivalently substituted or added. Additionally, more than two stroke type classifications (e.g., swish, non-swish type 1, non-swish type 2, etc.) could be used without departing from the invention.

The process begins at 104 after which the device awaits a stroke (either a swish or a non-swish stroke such as a tap) of the touch sensitive display. If no stroke is detected, the process waits at 112 until a stroke is detected at 108. At this point, an interrupt may be generated by the display interface circuitry or other action taken by the device's processor as a result of detection of the stroke and control passes to 116 where a determination is made to distinguish whether a swish or a non-swish stroke such as the exemplary tap has been entered, and categorize it as such. This determination can be made for the case of swish versus non-swish in certain embodiments, by detecting a movement of the touch location and determining at least one touch location and touch time associated with the movement; detecting a release location and time; and categorizing the stroke as a swish type stroke if: 1) the distance between the location of the release location and the initial touch location is larger than a distance threshold, 2) the initial touch location is within one of a set of specified regions of the touch sensitive medium, and 3) the difference in time between the touch time and the release time is less than a time threshold (e.g., 150–300 ms, for example. Other thresholds may also be suitable in certain embodiments).

In addition, the process may involve associating the stroke with one of a plurality of regions on the touch sensitive medium defined by at least one of the initial touch location (e.g., 59), the initial touch time, the intermediate touch location (e.g., 60), the intermediate touch time, the release location (e.g., 61) and the release time; associating the swish operation with one of a plurality of types defined by at least one of the initial touch location, the initial touch time, the intermediate touch location, the intermediate touch time, the release location and the release time; and conducting an action defined for the associated type of swish operation at the associated region. In the case of a swish stroke (according to the most stringent definition), the stroke is a simple stroke wherein the stroke moves in an approximately straight line between the initial touch location and the release location. Thus, the intermediate touch location should be approximately along the line defined by the touch location and the release location.

If a swish was entered, the process determines the grid cell containing the swish's touch point at 120. The process also determines the direction from the touch point to the release point at 124. These two pieces of information (which may be gathered in any desired order without departing from the invention) can then be used to map the swish to a desired input character at 128 and the character is selected as the character that the user desires to enter. Control then returns to 108 to await the next stroke.

Thus, in certain embodiments consistent with the present invention, a user interface method for an electronic device involves detecting a stroke of a touch sensitive medium forming a part of the electronic device, the stroke occurring on a region of the touch sensitive medium that could represent either one of an application function and a character input function; determining if the stroke can be categorized as a first type of stroke, wherein the first type of stroke corresponds to character input stokes, wherein the determination is based at least upon touch location, release location, and contact time associated with the stroke; if so, converting the stroke to a character input function; if not, categorizing the stroke as a second type, and translating the stroke to the application function.

In another embodiment consistent with certain embodiments of the present invention, a user interface method for an electronic device involves detecting a stroke of a touch sensitive medium forming a part of the electronic device, the stroke occurring on a region of the touch sensitive medium that could represent either one of an application function and a character input function; determining if the stroke can be categorized as a first type of stroke, wherein the first type of stroke corresponds to a character input stoke, and wherein the first type of stroke is used to represent each available character that can be input and is not used in any application function; if so, converting the stroke to a character input function; if not, categorizing the stroke as a second type, and translating the stroke to the application function.

In yet another embodiment consistent with certain embodiments of the invention, a user interface method for an electronic device involves detecting a stroke of a touch sensitive medium forming a part of the electronic device; categorizing the stroke as one of a swish type stroke and a non-swish type stroke; if the stroke is a swish type stroke, converting the swish type stroke to a character input function; if the stroke is a non-swish type stroke, translating the stroke into an application function.

Figure 7:
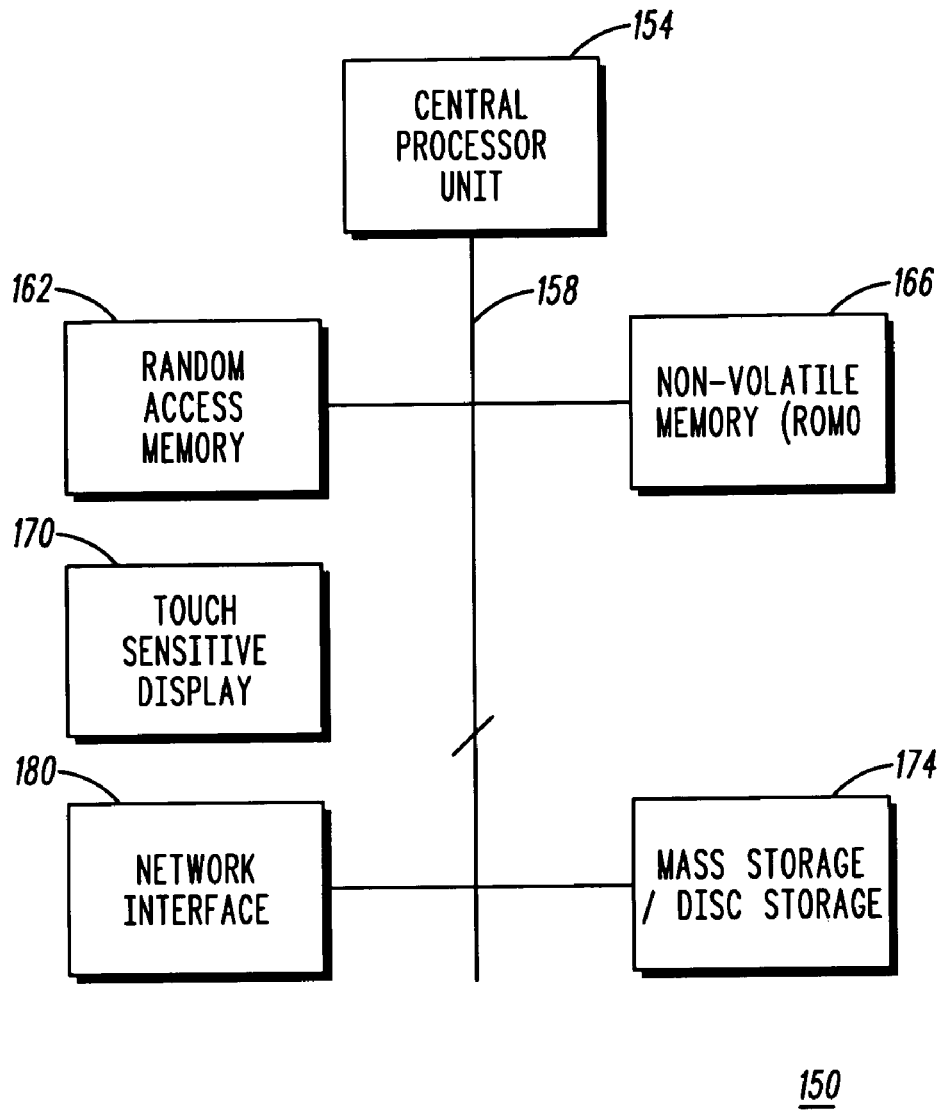
FIG. 7 is a block diagram of an exemplary electronic device that can utilize the data entry arrangement consistent with certain embodiments of the present invention.

The processes previously described can be carried out on a programmed general-purpose computer forming a part of a hand-held electronic device such as a PDA, messaging or paging device, or a wireless or wired telephone. Such as the exemplary computer 150 is depicted in FIG. 7. Computer 150 has a central processor unit (CPU) 154 with an associated bus 158 used to connect the central processor unit 154 to Random Access Memory 162 and/or Non-Volatile Memory 166 in a known manner. A touch sensitive display that forms at least a part of the input/output mechanism at 170 is provided as described above to provide a user interface. Computer 150 also may have disc storage 174 or other non-volatile mass storage for storing large amounts of information including, but not limited to, program files and data files. Computer 150 may be coupled to a local area network (LAN) and/or wide area network (WAN) and/or the Internet using a network interface 180 such as an Ethernet interface or a wireless LAN interface. In the case of a PDA, paging or messaging device or wireless telephone device, such network interface 180 also has wireless transmitter and receiver circuitry, which is not shown in detail to retain the generic nature of this figure. Those skilled in the art will appreciate, after consideration of the present teachings, that the computer 150 is similar or identical in structure to the computer structure that already forms a part of conventional PDAs, wireless telephones, messaging and paging devices, and the like; and can be adapted to carry out the process described above by a revision of the programming of the existing computer; or a separate computer can be provided without departing from the present invention.

Thus, when implemented using a programmable processor, a computer readable storage medium can contain instructions that, when executed on the programmed processor carries out a user interface method for an electronic device, the instructions including: a segment of code that detects a stroke of an area of a touch sensitive medium that could represent either an application function or a character input function, the touch sensitive medium forming a part of the electronic device; a segment of code that categorizes the stroke as one of a first type and a second type, wherein the second type of stroke is used to represent each available character that can be input and is not used in any application function; a segment of code that branches to a first operation if the stroke is of the first type and to a second operation if the stroke is of the second type; the first operation being carried out by a segment of code that translates the stroke to an application function; and the second operation being carried out by a segment of code that converts the stroke to a character input function.

Thus, an electronic apparatus such as a PDA, wireless telephone, paging device or messaging device, consistent with certain embodiments of the present invention has a touch sensitive display that provides a mechanism of user output and input. A computer receives input from the touch sensitive display and provides an output thereto. A user interface computer program runs on the computer, and carries out a process of: a detecting a stroke of a touch sensitive display forming a part of the electronic device; categorizing the stroke as one of a first type and a second type. If the stroke is of the first type, the user interface computer program translates the stroke to an application function, and the computer carries out the application function. If the stroke is of the second type, the user interface computer program maps the stroke to a character, and the character is entered as data.

Another embodiment of a an electronic apparatus such as a PDA, wireless telephone, paging device or messaging device, consistent with certain embodiments of the present invention has a touch sensitive display or other touch sensitive medium that provides a mechanism of user output and input; a computer receiving input from the touch sensitive display and providing an output thereto; a user interface program running on the computer, that carries out a process of: detecting a stroke of a touch sensitive display forming a part of the electronic device; categorizing the stroke as one of a swish type stroke and a non-swish type; if the stroke is of the non-swish type, translating the stroke to an application function; and if the stroke is of the second type, converting the stroke to a character input function.

It is beyond the scope of this discussion to define the best layout of a text entry grid for swish-based text input. However, it is noted that there is probably no single layout that would be preferred by all users. Some users are already familiar with the mapping on phone keypads (2abc, 3def, etc.) while others are not. Some users don't mind a learning phase if it pays off later in terms of speed and they would enjoy an optimized layout, while others want the layout to be intuitive and easy to memorize. Others may wish to conform to an alphabet based, QWERTY, style, or other layout. Other layouts may be based upon geometries other than a grid of cells. Each of these potential realizations is contemplated, as is an implementation wherein the user is able to select a layout from a plurality of different layouts.

Alphabets with large numbers of symbols, as well as caps and lower case characters, can potentially be addressed in several different ways. For example, with out intending to impose any limitation, there can be more than one layout (for lower case and upper case characters, for digits, for punctuation and special symbols), and switching from one to the other can be accomplished either by a swish, a unique gesture, or other selection mechanism. In other embodiments, a single layout containing all possible symbols can be used. If large areas of display real estate are used, the number of symbols can be quite high by simply increasing the number of cells (or other zones) of the grid, or by increasing the number of discriminating directions in each cell or zone. Alternatively, it might be easier to relax the definition of swish by loosening one of the constraints D, E, or F, while keeping the set of admissible swishes disjoint from the set of commands of all applications. In an alternative embodiment, two types of swish strokes can be permitted. In such an embodiment, allowing either slow swishes, or swishes of medium length, or swishes going back and forth, for example, permits the mapping of pairs of symbols (e.g. lower case/upper case, opening/closing bracket, etc.) in a mnemonic way into pairs of basic/complex swishes. Thus, uppercase and lowercase swishes can be distinguished without shifting from a lowercase mode to an uppercase mode. Other variations will occur to those skilled in the art upon consideration of the present teachings.

In one exemplary embodiment, alphabets with a large set of symbols can be handled by decomposing the set into several subsets of symbols, the union of which is the initial set and which can possibly have non-empty intersection. The symbols of each subset can be arranged into different layouts, with only one layout being shown at a time on the display overlay. One of these layouts can represent the main layout and is the one that is shown by default. The other layouts are auxiliary layouts. In the main layout, there can be one special text input command for each auxiliary layout. A swish stroke can then be used to switch the active layout from the main layout to the auxiliary layout. This switch can be of two types depending on the auxiliary layout: either permanent, (i.e., until the next change) or temporary, (i.e. valid for the next text input command only). If the two types of switches are desired for one particular auxiliary layout, then two different special text input commands should be available from the main layout, one to switch it. Each auxiliary layout allowing permanent switch should contain one special text input command in the form of a swish to get back to the main layout.

For example, an auxiliary layout containing digits (plus eventually other related symbols such as +, −, *, /, =, (, ), #, etc.) might be switched to in permanent mode only, since in most cases, when there is need to enter digits, a sequence of them is actually entered. On the other hand, it is desirable to be able to switch to a layout containing the upper case letters in two different ways: permanently when we need to enter an all caps word, or temporarily, when we need to enter a capitalized word. A layout containing special symbols such as @, $, %, &, ~, and accentuated letters, could for example be switched to only temporarily.

In certain embodiments consistent with the present invention, a swish keypad can reduce the number of keys by increasing the set of strokes allowed on each key. The same idea can be exploited further for an elegant solution to decrease the number of layouts, possibly to one single main layout, by recognizing different types of swishes. Every stroke can then be categorized into more than two groups: non swish strokes (as before, send to the application), simple swish strokes, complex swish strokes, possibly allowing for different types of complex swish strokes. Two types of swishes, simple and complex (or more), can be defined for example as follows: short and long strokes; unidirectional strokes and go-and-return strokes (starting like an unidirectional stroke and coming back); or fast and slow strokes. Each pair of swishes, simple and complex, can be mapped to a pair of logically related symbols of the alphabet such as: lower/upper case letters, open/close parenthesis (( ), [ ], { }, < >), single/double quote, dot/colon, comma/semi-colon, slash/backslash, and so on.

By appropriate definition of the concept of a swish stroke, which is a simple location dependent stroke, this stroke is specific enough to make it distinct from any strokes produced by "mouse-like" actions, such as tap, select, drag, scroll, etc. All possible symbols that are potentially entered as text on a touch-sensitive device can be thus mapped to swishes. By such a definition, the location of swishes can occupy large portions of the display real estate, up to and including substantially the entire active region of the display. A swish can be produced by finger input even on a very small device (i.e., no stylus is necessary—but could optionally be used). This swish based text entry is fast, accurate and can be silent. Text input based on swishes can be consistent throughout all applications and can be permanently available on the device without introducing potential confusion as to character entry and application commands. The user can potentially choose his/her favorite layout among a variety of proposed layouts, and an expert user may be able to input text without looking at the display.

Thus, a user interface method and apparatus for an electronic device operates in accordance with certain embodiments consistent with the present invention by detecting a stroke of a touch sensitive display forming a part of the electronic device. The stroke is categorized as one of a tap stroke or other non-swish stroke and a swish stroke (or other appropriate categories). If the stroke is a tap stroke, it is translated into an application function. If the stroke is a swish stroke, it is mapped to a character. The touch sensitive display has a grid containing cells, with each cell containing a plurality of characters, and the grid can overlay application interface to thereby occupying a common area, up to and including the entire area, of the touch sensitive display. By virtue of definition of the swish stroke as a stroke that can only be used for character input functions, devices consistent with certain embodiments of the present invention can operate full time in a mode that behaves as a text entry mode without need to use special commands or strokes to switch between modes, and eliminates or reduces the ambiguity between text entry and application functions.

While embodiments of the present invention have been described in conjunction with character input applications, certain embodiments consistent with aspects of the present invention can be devised in which commands and other functions that are repetitively used with high enough frequency within a particular application or group of applications can be dealt with as a character or collection of characters as described above. In one example, an overlay can be devised for an action game or collection of such games for use to control character movement or other actions. Such commands can be presented in an overlay in the same manner as with the character set examples above. In addition, other common commands can similarly be categorized along with characters or collections thereof to implement common functions. Those skilled in the art will appreciate that in this context, such commands behave exactly as if they are a part of the character set and can thus be considered the same as a character.

Thus, an input/output apparatus for an electronic device, can be provided in which a touch sensitive display having a touch sensitive display area has a grid overlaying a portion of the display area, the grid representing an arrangement of commands that can be entered. An application interface is displayed on the same portion of the display area simultaneously with the grid, wherein the electronic device responds to a predetermined type of touch stroke to enter commands from the arrangement of commands on the grid into the application. Commands can thereby be entered, for example, using a predetermined type of touch stroke such as a swish stroke. The grid can be displayed prominently in a first display mode and less prominently in a second display mode, wherein the grid is displayed in the second display mode in a different manner by use of one or more of a different color, a lesser intensity, a lower contrast, dashed lines, broken lines, etc.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors, which are equivalents to the invention as described and claimed. Similarly, general purpose computers, microprocessor based computers, micro-controllers, optical computers, analog computers, programmable logic circuits, dedicated processors and/or dedicated hard wired logic may be used to construct alternative equivalent embodiments of the present invention.

Those skilled in the art will appreciate that the program steps and associated data used to implement the embodiments described above can be implemented using any suitable computer readable storage medium such as for example disc storage, Read Only Memory (ROM) devices, Random Access Memory (RAM) devices, semiconductor storage elements, optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, has been described as being implemented using a programmed processor executing programming instructions that are broadly described above in flow chart form that can be stored on any suitable computer readable storage medium (e.g., disc storage, optical storage, semiconductor storage, etc.) or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface, text entry grid, and information presentation without departing from the present invention. Although an email application has been used as an illustrative application, the present invention can be used in conjunction with any suitable application and is clearly not limited to only the example email application illustrated. Such variations are contemplated and considered equivalent.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A user interface method for an electronic device, comprising:
   detecting a stroke of a touch sensitive medium forming a part of the electronic device, the stroke occurring on a region of the touch sensitive medium that could represent either one of an application function and a character input function;
   determining if the stroke can be categorized as a first type of stroke, wherein the first type of stroke corresponds to character input stokes, wherein the determination is based at least upon touch location, release location, and contact time associated with the stroke;
   if so, converting the stroke to a character input function; and
   if not, categorizing the stroke as a second type, and translating the stroke to the application function,
   wherein the touch sensitive medium comprises a touch sensitive display, and
   wherein the electronic device further comprises an application interface, and
   wherein the touch sensitive display has a grid containing cells, with each cell containing a plurality of characters, and
   wherein the grid overlays the application interface thereby occupying a common area of the touch sensitive display, and
   wherein the grid is displayed simultaneously with the application interface, and
   wherein a feature of the grid is displayed prominently in a first display mode and less prominently in a second display mode.

2. The user interface method according to claim 1, wherein the feature of the grid is displayed in the second display mode in a different manner than in the first display mode and wherein the different manner comprises at least one of a different color, a lesser intensity, a lower contrast, dashed lines, and broken lines.

3. A user interface method for an electronic device, comprising:
   detecting a stroke of a touch sensitive medium forming a part of the electronic device;
   categorizing the stroke as one of a swish type stroke and a non-swish type stroke;
   if the stroke is a swish type stroke, converting the swish type stroke to a character input function; and
   if the stroke is a non-swish type stroke, translating the stroke into an application function,
   wherein the touch sensitive medium comprises a touch sensitive display, and wherein the touch sensitive display has a grid containing cells, with each cell being associated with a plurality of characters; and wherein the converting comprises identifying a grid cell of the touch sensitive display containing a touch point of the swish stroke, determining a direction of movement associated with the swish stroke, and mapping the region and direction to the character, and wherein the electronic device further comprises an application interface, and wherein the grid overlays the application interface thereby occupying a common area of the touch sensitive display, and wherein the grid is displayed simultaneously with the application interface, and wherein a feature of the grid is displayed prominently in a first display mode and less prominently in a second display mode.

4. The user interface method according to claim 3, wherein the feature of the grid is displayed in the second display mode in a different manner than in the first display mode and wherein the different manner comprises at least one of a different color, a lesser intensity, a lower contrast, dashed lines, and broken lines.

5. An electronic apparatus, comprising:
a touch sensitive display that provides a mechanism of user output and input;
a computer receiving input from the touch sensitive display and providing an output thereto;
a user interface program running on the computer, that carries out a process of
detecting a stroke of a touch sensitive display forming a part of the electronic device,
categorizing the stroke as one of a swish type stroke and a non-swish type,
if the stroke is of the non-swish type, translating the stroke to an application function and
if the stroke is of the second type, converting the stroke to a character input function; and
a computer program running on the computer,
wherein the computer program further comprises an application interface, and
wherein the touch sensitive display has a grid containing cells, with each cell containing a plurality of characters, and
wherein the grid overlays the application interface thereby occupying a common area of the touch sensitive display therewith, and
wherein the grid is displayed simultaneously with the application interface, and
wherein a feature of the grid is displayed prominently in a first display mode and less prominently in a second display mode.

6. The electronic apparatus according to claim 5, wherein the feature of the grid is displayed in the second display mode in a different manner than in the first display mode and wherein the different manner comprises at least one of a different color, a lesser intensity, a lower contrast, dashed lines, and broken lines.

7. An electronic apparatus, comprising, comprising:
a touch sensitive display that provides a mechanism of user output and input;
a computer receiving input from the touch sensitive display and providing an output thereto;
means for detecting a stroke of the touch sensitive display;

means for categorizing the stroke as one of a swish type stroke and a non-swish type stroke;
means for translating the tap into an application function, if the stroke is a non-swish type stroke; and
means for converting the swish-type stroke to a character input function, if the stroke is a swish type stroke,
wherein the grid overlays substantially the entire touch sensitive display, and
wherein the grid is displayed simultaneously with the application interface, and
wherein a feature of the grid is displayed prominently in a first display mode and less prominently in a second display mode.

8. The electronic apparatus according to claim 7, wherein the feature of the grid is displayed in the second display mode in a different manner than in the first display mode and wherein the different manner comprises at least one of a different color, a lesser intensity, a lower contrast, dashed lines, and broken lines.

9. An input/output apparatus for an electronic device, comprising:
a touch sensitive display having a touch sensitive display area;
a grid overlaying a portion of the display area, the grid representing an arrangement of characters that can be entered; and
an application interface, displayed on the same portion of the display area,
wherein the electronic device responds to a first type of touch stroke to enter characters, and responds to a second type of touch stroke to interact with the application interface, and
wherein the first type of touch stroke comprises a tap stroke and the second type of touch stroke comprises a swish stroke, and
wherein the grid is displayed simultaneously with the application interface, and
wherein a feature of the grid is displayed prominently in a first display mode and less prominently in a second display mode.

10. The input/output apparatus according to claim 9, wherein the feature of the grid is displayed in the second display mode in a different manner than in the first display mode and wherein the different manner comprises at least one of a different color, a lesser intensity, a lower contrast, dashed lines, and broken lines.

11. A user interface method for an electronic device, comprising:
detecting a stroke of a touch sensitive medium forming a part of the electronic device, the stroke occurring on a region of the touch sensitive medium that could represent either one of an application function and a character input function;
determining if the stroke can be categorized as a first type of stroke, wherein the first type of stroke corresponds to a character input stoke, and wherein the first type of stroke is used to represent each available character that can be input and is not used in any application function;
if so, converting the stroke to a character input function;
if not, categorizing the stroke as a second type, and translating the stroke to the application function,
wherein the touch sensitive medium comprises a display area and wherein a grid overlays a portion of the display area, the grid representing an arrangement of characters that can be entered, and
wherein the grid is displayed simultaneously with an application interface, and wherein a feature of the grid is displayed prominently in a first display mode and less prominently in a second display mode.

12. The user interface method according to claim 11, wherein the feature of the grid is displayed in the second display mode in a different manner than in the first display mode and wherein the different manner comprises at least one of a different color, a lesser intensity, a lower contrast, dashed lines, and broken lines.

13. An input/output apparatus for an electronic device, comprising:
   a touch sensitive display having a touch sensitive display area;
   a grid overlaying a portion of the display area, the grid representing an arrangement of commands that can be entered; and
   an application interface, displayed on the same portion of the display area simultaneously with the grid, wherein the electronic device responds to a predetermined type of touch stroke to enter commands from the arrangement of commands on the grid into the
   wherein a feature of the grid is displayed prominently in a first display mode and less prominently in a second display mode.

14. The input/output apparatus according to claim 13, wherein the feature of the grid is displayed in the second display mode in a different manner than in the first display mode and wherein the different manner comprises at least one of a different color, a lesser intensity, a lower contrast, dashed lines, and broken lines.

* * * * *